(12) United States Patent  (10) Patent No.: US 8,619,441 B2
Chen et al.  (45) Date of Patent: Dec. 31, 2013

(54) SWITCHING REGULATOR (71) Applicant: Fuji Electric Co., Ltd., Kawasaki (JP)

(72) Inventors: Jian Chen, Matsumoto (JP); Masayuki Yamadaya, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 13/672,834

(22) Filed: Nov. 9, 2012

(65) Prior Publication Data

US 2013/0148386 A1 Jun. 13, 2013

(30) Foreign Application Priority Data

Dec. 12, 2011 (JP) ................................. 2011-270930

(51) Int. Cl.
*H02M 3/335* (2006.01)
(52) U.S. Cl.
USPC ........................................ 363/21.15; 363/97
(58) Field of Classification Search
USPC ..................... 363/21.07, 21.15, 97
See application file for complete search history.

(56) References Cited

U.S. PATENT DOCUMENTS

| 8,077,487 B2 * | 12/2011 | Huynh ........................ 363/21.15 |
| 8,503,196 B2 * | 8/2013 | Tai et al. ..................... 363/21.15 |
| 2005/0078492 A1 * | 4/2005 | Takahashi ................... 363/21.15 |
| 2009/0290386 A1 | 11/2009 | Ikeda et al. |
| 2010/0202170 A1 * | 8/2010 | Kim et al. ........................ 363/74 |
| 2012/0008346 A1 * | 1/2012 | Kawamura ................. 363/21.15 |

FOREIGN PATENT DOCUMENTS

| JP | 2007-215316 A | 8/2007 |
| JP | 2009-284618 A | 12/2009 |
| JP | 2010-063293 A | 3/2010 |

* cited by examiner

*Primary Examiner* — Gary L Laxton
(74) *Attorney, Agent, or Firm* — Rossi, Kimms & McDowell LLP (57) ABSTRACT

A switching regulator can include a transformer having a primary winding and a secondary winding, a switching circuit including a switching element that is connected in series to the primary winding, the series-connected circuit of the switching element and the primary winding being connected in parallel to a DC power supply and a rectifying circuit connected to the secondary winding. The switching regulator can also include a control circuit to control switching of the switching element to generate DC output voltage from the DC power supply, the DC output voltage being insulated from the DC power supply, an output voltage detecting circuit including a photo-coupler for insulated detection of the DC output voltage, the photo-coupler having a photo-transistor and a load quantity detector for detecting a state in which power consumption in the load connected to the DC output has reached a predetermined value.

6 Claims, 9 Drawing Sheets

SWITCHING REGULATOR

BACKGROUND OF THE INVENTION

1. Field of the Invention

Embodiments of the present invention relate to a technology to reduce power consumption in switching regulators, and, in particular, to a technology to reduce power consumption in voltage detection circuits that use photo-couplers.

2. Description of the Related Art

Figure 8:
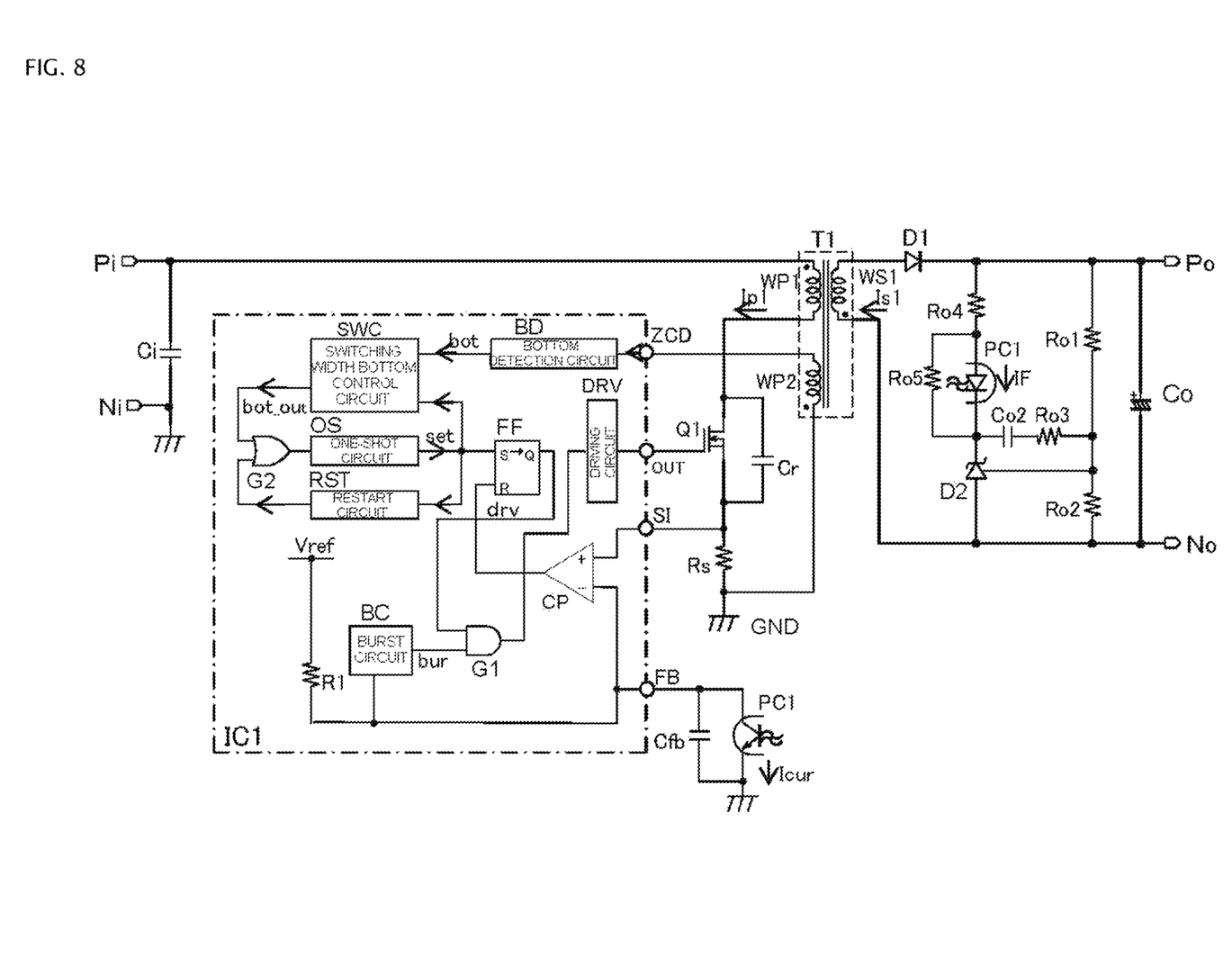
FIG. 8 shows an example of circuit diagram of a conventional switching regulator.

FIG. 8 shows an example of the circuit of a current mode quasi-resonant type switching regulator of a conventional technology disclosed in Japanese Unexamined Patent Application Publication No. 2007-215316 (also referred to herein as "Patent Document 1"). The switching regulator includes a transformer T1 that has a primary winding WP1, secondary winding WS1, and an auxiliary winding WP2. An end of the primary winding WP1 is connected to an input terminal Pi and the other terminal is connected to the drain of the MOSFET of a switching element Q1. An end of the secondary winding WS1 is connected to a positive output terminal Po through a diode D1, and the other end is connected to a negative output terminal No. An end of the auxiliary winding WP2 is connected to a ZCD terminal that is an input terminal for zero current detection in a switching control circuit IC1, and the other end is connected to the ground GND of the primary side circuit.

A smoothing capacitor Ci is connected between the positive input terminal Pi and the negative input terminal Ni; a smoothing capacitor Co is connected between the positive output terminal Po and the negative output terminal No; and a resonance capacitor Cr is connected between the drain and source of the switching element Q1 in parallel with the switching element Q1. Between the positive output terminal Po and the negative output terminal No also connected is a voltage-dividing circuit consisting of resistors Ro1 and Ro2. A resistor Rs for current detection is connected between the source of the switching element Q1 and the ground.

The switching control circuit IC1 contains: a bottom detecting circuit BD, a switching width bottom controlling circuit SWC, an OR circuit G2, a one-shot circuit OS, a restart circuit RST, a flip-flop FF, a driving circuit DRV, a comparator CP, a burst circuit BC, and an AND circuit G1. This switching control circuit IC1 is composed as a semiconductor integrated circuit. The terminal OUT of the switching control circuit IC1 is connected to the gate of the switching element Q1; the terminal SI, to the connection point between the source of the switching element Q1 and the resistor Rs; and the FB terminal, to the collector of a photo-transistor of a photo-coupler PC1 for output voltage detection. Since Patent Document 1 describes the circuit construction and operation of the light emitting diode side of the photo-coupler PC1, the description thereon is omitted here.

The bottom-detecting circuit BD detects a bottom (or a locally minimum state) of the output voltage of the auxiliary winding WP2 applied to the ZCD terminal, and delivers a bot signal, which is fed to the switching width bottom control circuit SWC.

The switching width bottom control circuit SWC determines whether to output a bot_out signal based on the first bot signal or to output a bot_out signal based on a later bot signal. The one-shot circuit OS outputs a set signal, which sets the flip-flop FF. Consequently, the output Q of the flip-flop FF becomes an H level signal of driving signal dry to turn ON the switching element Q1. When the switching element Q1 turns ON, the current increases and is detected with the resistor Rs as a voltage. When this voltage reaches the voltage at the terminal FB to which the collector of the photo-transistor of the photo-coupler PC1 for detecting the voltage between the output terminals Po and No is connected, the output of the comparator CP becomes an H signal to reset the flip-flop FF. As a consequence, the switching element Q1 turns OFF and the magnetic energy stored in the transformer T1 during the ON state is transferred to the secondary winding WS1 and through the diode D1, to the DC output capacitor Co charging the capacitor Co and raising the output voltage. By repeating the processes, the DC output voltage is controlled at a predetermined constant voltage.

The burst circuit BC is provided to decrease the number of switching during no loading or light loading state and reduce power consumption. When the output signal bur from the burst circuit BC is L (at a low level), the AND circuit G1 interrupts the driving signal drv.

The resistor R1 connected between the reference voltage Vref in the control circuit IC1 and the terminal FB works for converting the feedback signal from the photo-coupler to a voltage. When the DC output voltage is going to decrease, the photo-coupler works to raise the voltage at the terminal FB, and when the DC output voltage is going to increase, the photo-coupler works to lower the voltage at the terminal FB. These operation controls the current through the switching element Q1 to control the DC output voltage at a predetermined constant voltage.

In the above-described example of switching regulator, a photo-coupler is used in the feedback circuit to detect the DC output voltage in the secondary side of the transformer with electrical insulation. The current Icur through the photo-transistor connected in the primary side circuit is determined from the voltage Vref applied to the pull-up resistor R1, a resistance value Ra of the pull-up resistor R1, and a control voltage Vfb, which is a voltage at the terminal FB, and given by the following equation (1).

$$Icur=(Vref-Vfb)/Ra \qquad (1)$$

The current If through a light-emitting diode connected to the secondary side circuit of the photo-coupler is given by the following equation (2).

$$If=Icur/CTR=(Vref-Vfb)/Ra/CTR \qquad (2),$$

where CTR is a current transfer ratio of the photo-coupler.

Equations (1) and (2) indicate that a heavy load condition (with large power consumption in the load), at which the voltage Vfb at the terminal FB is high, results in a small current Icur and If; a light load condition (with small power consumption in the load), at which the voltage Vfb at the terminal FB is low, results in a large current Icur and If. Therefore, power load due to the current Icur and current If during a low load period and no load period is larger than that during a heavy load period. The power consumption during a waiting period, in particular, is a problem to be solved.

To reduce the power consumption during a waiting period, it is an effective means to decrease the current Icur and If. Although a larger pull up resistance value could decrease the current Icur and current If, the pull up resistance value must be set at such a value that the current Icur at the maximum power is larger than the dark current, which is a current flowing in the photo-transistor under a state of no light emission from the light emitting diode, of the photo-coupler. Otherwise, the DC output voltage cannot be detected to fail to supply the maximum power.

Figure 9:
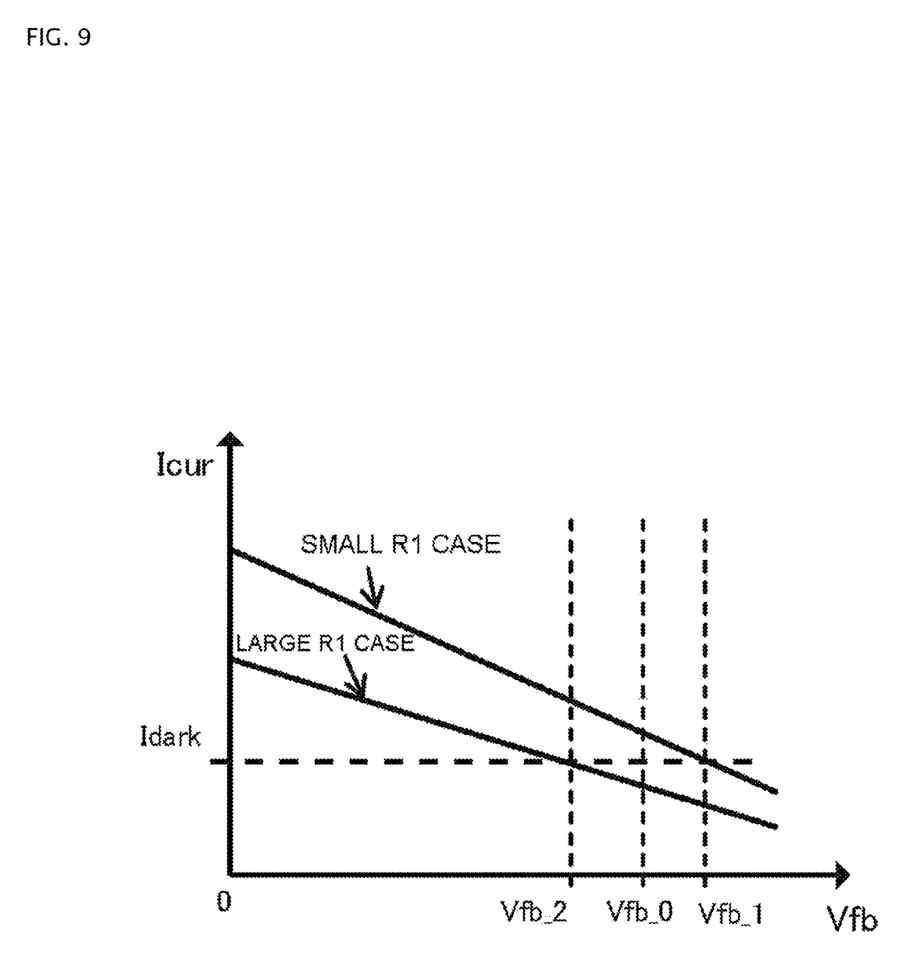
FIG. 9 shows a relationship between the current Icur through the photo-coupler and the control voltage Vfb in the conventional switching regulator.

FIG. 9 shows a relationship between the current Icur through the photo-transistor and the control voltage Vfb. The Icur at the control voltage Vfb_0 at the maximum load must be selected at a value larger than the dark current Idark of the photo-coupler. As shown in FIG. 9, this condition is satisfied in the case of a small R1 value, while the condition is not satisfied in the case of a large R1 value.

SUMMARY OF THE INVENTION

Embodiments of the invention address these and other needs. Certain embodiments thus provide a switching regulator using a photo-coupler for detecting such a DC output voltage with electrical insulation that reduces the current in the photo-coupler to decrease power consumption.

A first aspect of the invention is a switching regulator comprising: a transformer having a primary winding and a secondary winding; a switching circuit including a switching element that is connected in series to the primary winding, the series-connected circuit of the switching element and the primary winding being connected in parallel to a DC power supply; a rectifying circuit connected to the secondary winding; a control circuit to control switching of the switching element to generate DC output voltage from the DC power supply, the DC output voltage being insulated from the DC power supply; an output voltage detecting circuit including a photo-coupler for insulated detection of the DC output voltage, the photo-coupler having a photo-transistor; and a load quantity detector configured to detect a state in which power consumption in the load connected to the DC output has reached a predetermined value; wherein one end of the photo-transistor is connected to one end of a power supply of the control circuit; the control circuit comprises a series-connected resistor circuit including a plurality of resistors and a switch for short-circuiting one of the plurality of resistors that are connected between the other terminal of the photo-transistor and a reference voltage point in the control circuit; the other terminal of the photo-transistor receiving the DC output voltage as a feedback voltage is connected to the control circuit; and the switch is turned ON or OFF corresponding to an output signal from the load quantity detector.

A second aspect of the invention is a switching regulator comprising: a transformer having a primary winding and a secondary winding; a switching circuit including a switching element that is connected in series to the primary winding, the series-connected circuit of the switching element and the primary winding being connected in parallel to a DC power supply; a rectifying circuit connected to the secondary winding; a control circuit to control switching of the switching element to generate DC output voltage from the DC power supply, the DC output voltage being insulated from the DC power supply; an output voltage detecting circuit including a photo-coupler for insulated detection of the DC output voltage, the photo-coupler having a photo-transistor; and a load quantity detector configured to detect a state in which power consumption in the load connected to the DC output has reached a predetermined value; wherein one end of the photo-transistor is connected to one end of a power supply of the control circuit; the control circuit comprises a parallel-connected circuit of a first resistor and a series-connected circuit of a second resistor and a switch, the parallel-connected circuit being connected between the other terminal of the photo-transistor and a reference voltage point in the control circuit; the other terminal of the photo-transistor receiving the DC output voltage as a feedback voltage is connected to the control circuit; and the switch is turned ON or OFF corresponding to an output signal from the load quantity detector.

A third aspect of the invention is a switching regulator comprising: a transformer having a primary winding and a secondary winding; a switching circuit including a switching element that is connected in series to the primary winding, the series-connected circuit of the switching element and the primary winding being connected in parallel to a DC power supply; a rectifying circuit connected to the secondary winding; a control circuit to control switching of the switching element to generate DC output voltage from the DC power supply, the DC output voltage being insulated from the DC power supply; an output voltage detecting circuit including a photo-coupler for insulated detection of the DC output voltage, the photo-coupler having a photo-transistor; and a load quantity detector configured to detect a state in which power consumption in the load connected to the DC output has reached a predetermined value; wherein one end of the photo-transistor is connected to one end of a power supply of the control circuit; the control circuit comprises a resistor one end of which is connected to the other terminal of the photo-transistor, a first reference voltage point and a second reference voltage point in the control circuit, and a switch for changing over between the first and the second reference voltage points, the switch being connected to the other end of the resistor; the other terminal of the photo-transistor receiving the DC output voltage as a feedback voltage is connected to the control circuit; and the switch is turned ON or OFF corresponding to an output signal from the load quantity detector.

A fourth aspect of the invention is the switching regulator according to any one of the first through third aspects of the invention, wherein the load quantity detector determines a light loading state by detecting occurrence of two or more times of bottoms in a resonance waveform after turning OFF of the switching element.

According to certain embodiments, a resistance value of a pull up resistor for a photo-transistor of a photo-coupler is changed corresponding to the power in the load, or two reference voltages are prepared to connect to a pull up resistor and changed over corresponding to the power in the load. By way of certain embodiments, power consumption in the photo-coupler circuit can be reduced.

DETAILED DESCRIPTION

Embodiments of the invention reduce power consumption in the feedback circuit that uses a photo-coupler to detect a secondary side DC output voltage that is insulation-converted with a transformer in a switching regulator. In some embodiments, this reduction of power consumption is carried out by changing a resistance value of a pull up resistor for a photo-transistor of the photo-coupler corresponding to the power in the load, or the reduction of power consumption is carried out by preparing two reference voltages to connect to the pull up resistor and changing over them corresponding to the power in the load.

First Embodiment

Figure 1:
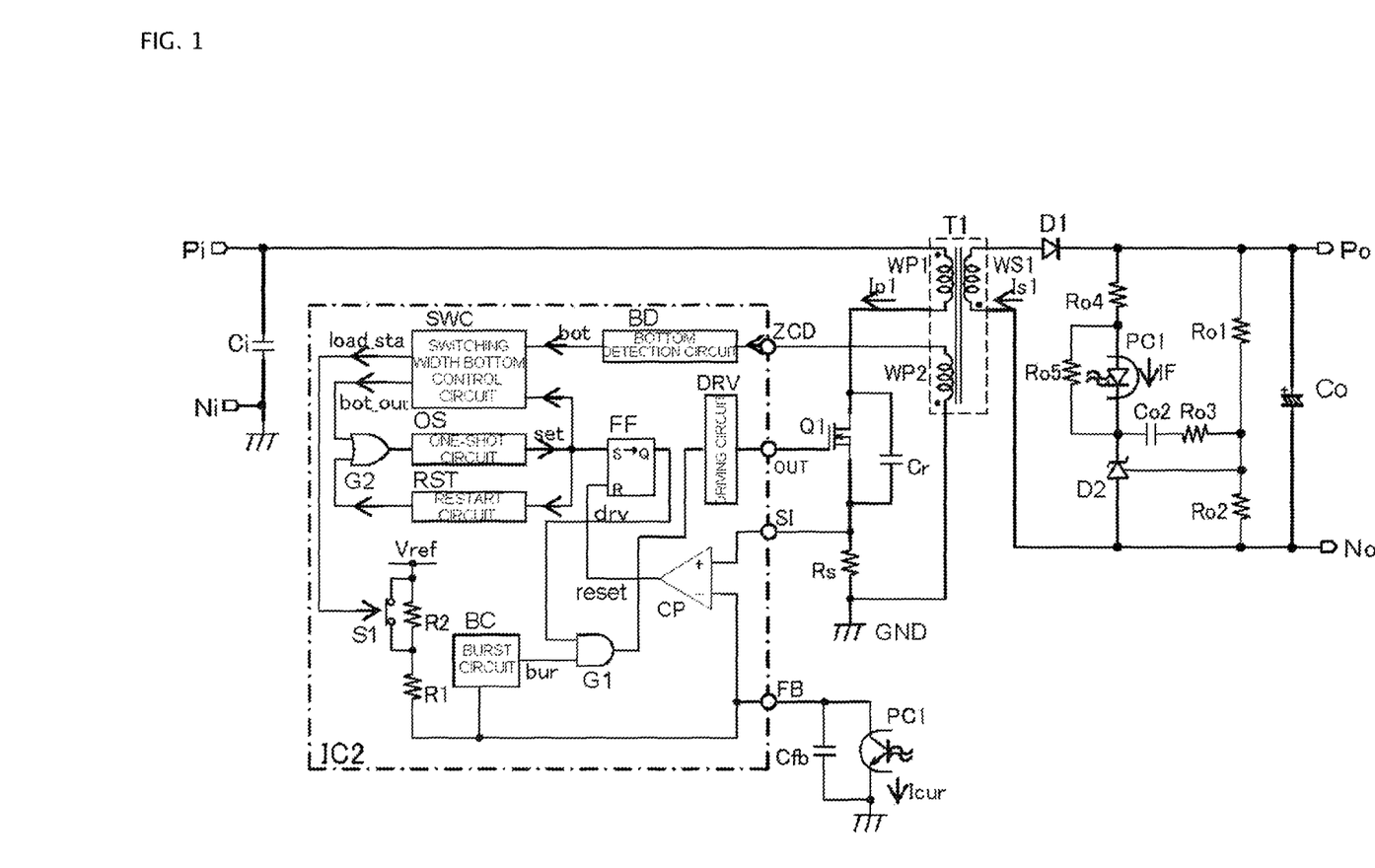
FIG. 1 shows an example of circuit diagram of a switching regulator of a first embodiment of the present invention.

FIG. 1 shows an example of circuit diagram of a switching regulator of a first embodiment according to the present invention. The switching regulator of FIG. 1 is different from the conventional one shown in FIG. 8 in that a series-connected circuit of resistors R2 and R1, with a switch S1 connected in parallel with the resistor R2, is connected between a reference voltage Vref in a control circuit IC2 and a terminal FB connected to the collector of a photo-transistor of a photo-coupler PC1. In addition, a driving signal load_sta for the switch S1 is delivered by the switching width bottom control circuit SWC in the switching regulator of the embodiment.

Figure 2:
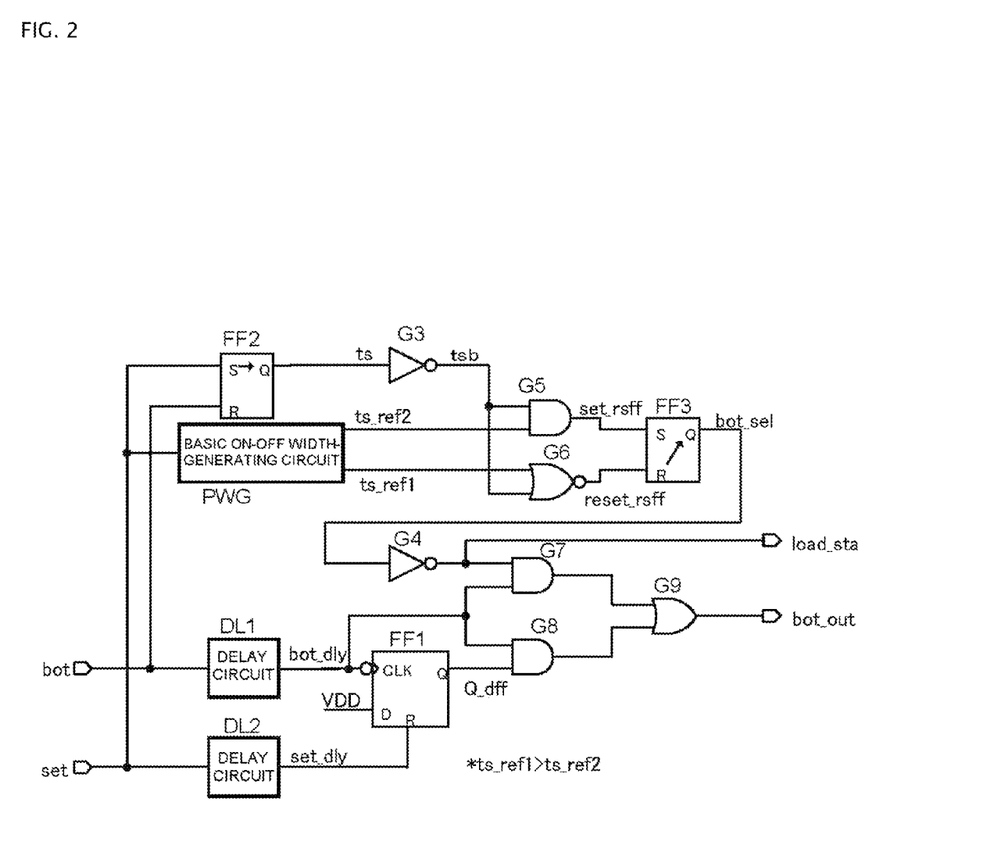
FIG. 2 shows an example of the switching width bottom control circuit SWC indicated in FIG. 1.
Figure 3:
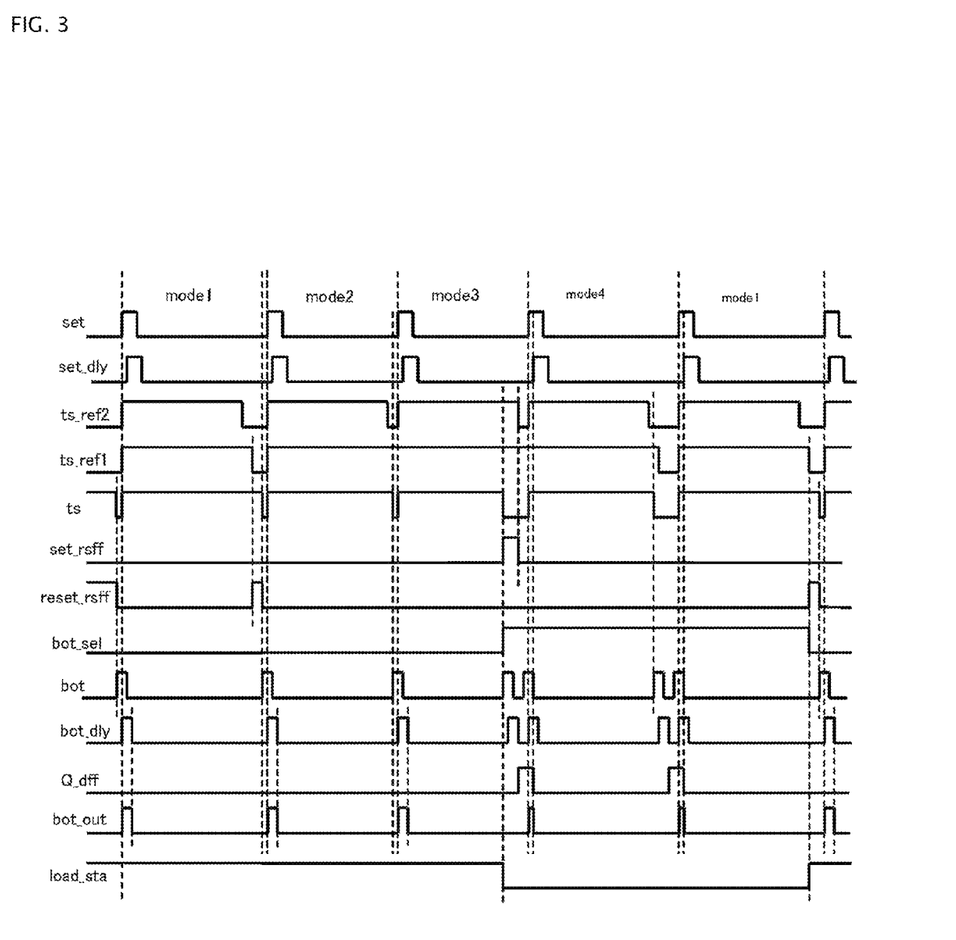
FIG. 3 is a time chart showing the operation of the control circuit.

FIG. 2 shows an example of the switching width bottom control circuit SWC and FIG. 3 is a time chart showing the operation of the control circuit. A flip-flop FF2 and a basic ON-OFF width-generating circuit PWG compose a switching width-generating circuit. The flip-flop FF2 receives a set signal at a set terminal and a bot signal at a reset terminal and delivers an ON width ts signal from the Q output terminal. The basic ON-OFF width generating circuit PWG generates a ts_ref1 signal and a ts_ref2 signal that are synchronous with the set signal. The ts_ref1 signal and a ts_ref2 signal are used for references to compare with the time duration of the ts signal. The duration of the ts signal at an H level indicates an ON width ts of the switching element Q1. The ON width ts of the switching element Q1 designates a magnitude of the load and takes a large value for a heavy load (or a large output power). The ts_ref1 signal and the ts_ref2 signal are used for references to compare with the ON width ts and used for judgment of the magnitude of the load. One of the operation modes 1 through 4 is selected in the embodiment according to comparison between the ON width ts that indicates the magnitude of the load and the reference value ts_ref1 and ts_ref2 of the ON width that are given by the ts_ref1 signal and the ts_ref2 signal. The ts_ref1 is set at a larger value than the ts_ref2 in this embodiment example.

As shown in FIG. 2, the ts signal is inverted in the inverter G3. The tsb signal out of the inverter G3 is delivered to one input terminal of an AND circuit G5 and one input terminal of a NOR circuit G6. The ts_ref2 signal is delivered to the other input terminal of the AND circuit and the ts_ref1 signal is delivered to the other input terminal of the NOR circuit G6.

Figure 4:
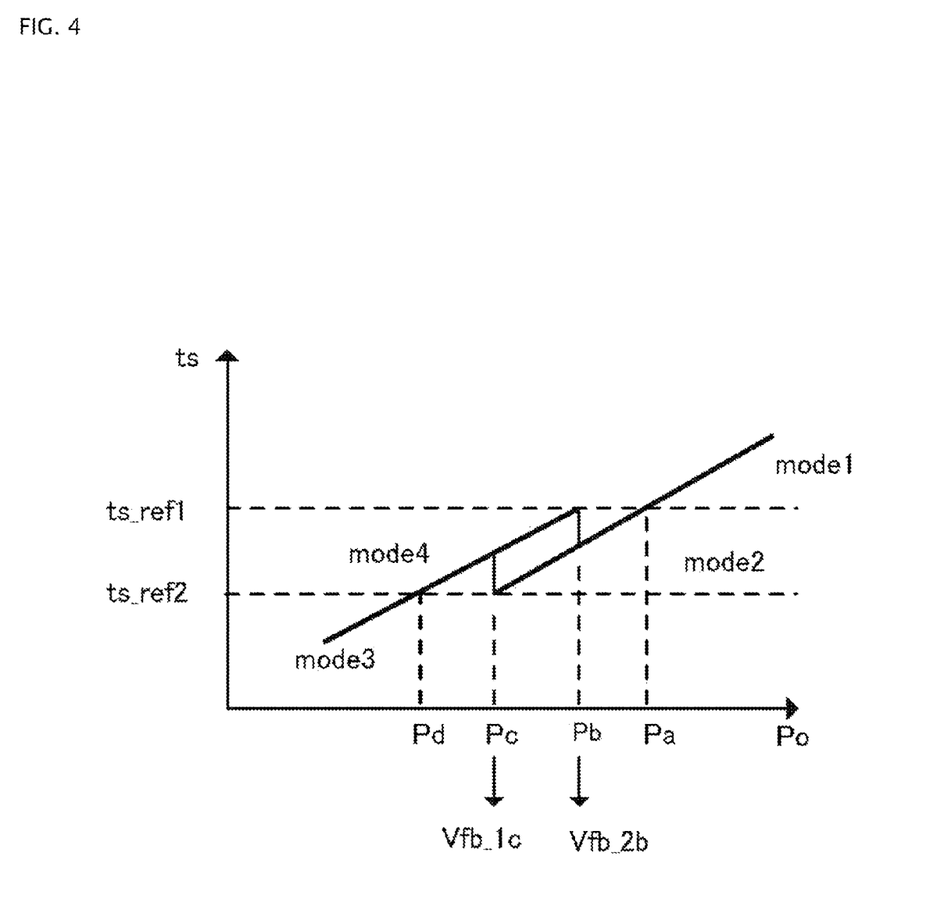
FIG. 4 shows the operation in changing times.

FIG. 4 is a graph showing a relationship among the reference values ts_ref1, ts_ref2 of switching widths, operation modes, and the load Po. As can be seen in FIG. 4 and the time chart of FIG. 3, the operation mode 1 holds the relation ts>ts_ref1 and the load relationship Po>Pa. The NOR circuit G6 delivers a reset_rsff signal to the reset terminal of an RS flip-flop of reset priority FF3 to reset the flip-flop.

The load Pa, Pb, Pc, and Pd in FIG. 4 are examples set at 60%, 50%, 40%, and 30% of the rated load, respectively.

The operation mode 2, in which the flip-flop FF3 is in a reset condition, holds the relationships ts<ts_ref1 and ts>ts_ref2, and the load relationship Pa>Po>Pc. The AND circuit G5 and the NOR circuit G6 delivers no positive signal, which means the output terminals of these circuits are at the L level.

The operation mode 3 holds the relationship ts<ts_ref2 and the load relationship Po<Pd. The AND circuit G5 delivers a set_rsff signal to the set terminal S of the flip-flop FF3.

The operation mode 4, in which the flip-flop FF3 is in a set condition, holds the relationships ts<ts_ref1 and ts>ts_ref2 and the load relationship Pb>Po>Pd. The output terminals of the AND circuit G5 and the NOR circuit G6 are at the L level.

The bot_sel signal delivered by the flip-flop FF3 is at an H level in the period indicated in FIG. 3. The bot_sel signal selects the number of bottoms of the voltage given from the auxiliary winding WP2 of the transformer, the voltage corresponding to the drain voltage of the switching element Q1 in a resonance condition. When the bot_sel is at an L level, the number of bottom of one is selected and when the bot_sel is at an H level, the number of bottoms of two is selected.

The bot_sel signal is given to one input terminal of an AND circuit G7 through an inverter G4.

The bot signal is given to a delay circuit DL1 and the set signal is given to a delay circuit DL2 in the switching width bottom control circuit SWC. The delay times of these delay circuits DL1 and DL2 are both set at 100 ns, which is a half of the pulse width of the bot signal.

The output bot_dly signal from the delay circuit DL1 is given to the other input terminal of the AND circuit G7, the clock terminal CLK of the D flip-flop FF1, and one input terminal of an AND circuit G8. The output set_dly signal from the delay circuit DL2 is given to the reset terminal R of the D flip-flop FF1.

The bot_out signal is at an H level when the bot_sel signal is at an L level (exhibiting normal loading) and the bot_dly signal is at an H level. The bot_out signal is delivered through the OR circuit G2 to the one-shot circuit OS triggering the one-shot circuit OS to output a set signal, as shown in FIG. 1. The set signal sets the flip-flop FF turning the dry signal to an H level, which turns ON the switching element Q1. The flip-flop FF is reset by the reset signal from a comparator CP as shown in FIG. 1. This reset of the flip-flop FF turns the switching element Q1 OFF.

When the bot_sel signal is at an H level (exhibiting a light loading state), on the other hand, the output terminal of the AND circuit G7 is fixed at an L level. Corresponding to a falling down edge of the first bot_dly signal, the D flip-flop FF1 reads the power supply voltage VDD for the switching control circuit IC2, the voltage being fed to the data input terminal D of the D flip-flop FF1 and exhibiting an H level. On reading the voltage VDD, the D flip-flop FF1 delivers a Q_dff signal at an H level to the other input terminal of the AND circuit G8. When the second bot_dly signal is given to the one terminal of the AND circuit G8, the output terminal of the AND circuit G8 turns to an H level, and the bot_out signal accordingly turns to an H level.

On transition of the bot_out signal to an H level, the one-shot circuit OS is triggered to deliver a set signal as shown in FIG. 1. This sets the flip-flop FF to turn the switching element Q1 ON. In this process described above, the switching element Q1 turns ON when the second bottom takes place in resonance voltage. Thus, bottom-skip control is performed in a light loading state.

The D flip-flop FF1 is reset by the rising up edge of the set_dly signal based on the set signal. The reset of the D flip-flop FF1 changes the Q_dff signal and the bot_out signal from an H level to an L level.

If the restart circuit RST does not receive a new set signal for a predetermined time, for example 30 μs after receiving a previous set signal, the restart circuit RST delivers a restart signal to the OR circuit G2 to trigger the one-shot circuit OS, as shown in FIG. 1.

As described above, the signal load_sta is an inverted signal of the signal bot_sel and discriminates between a light loading state and a heavy loading state.

Figure 5:
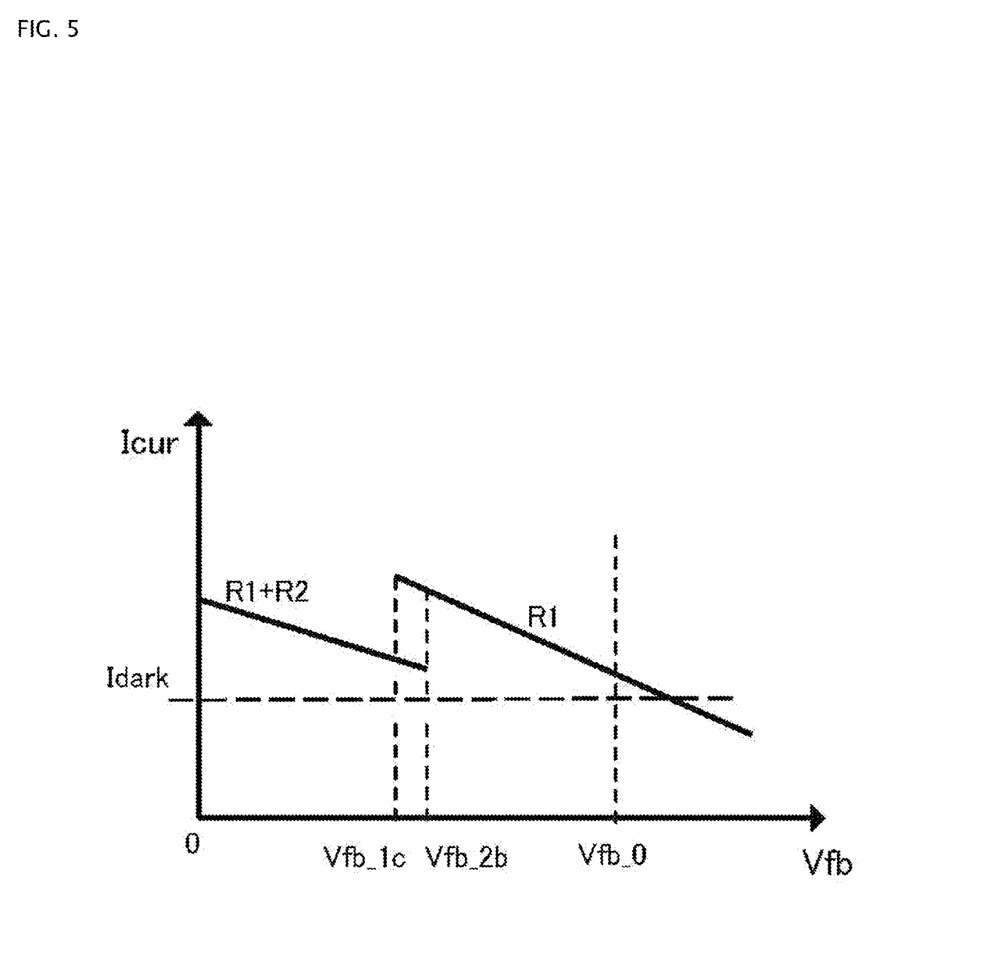
FIG. 5 shows a relationship between the current Icur through the photo-coupler and the control voltage Vfb in the switching regulator of the first embodiment.

This signal is used for changing the switch S1 indicated in FIG. 1 to increase the pull up resistance value in a light loading state. Thus, power consumption is reduced in the photo-coupler circuit. FIG. 5 shows a relationship between the current Icur through the photo-transistor and the control voltage Vfb when the pull up resistance value is changed. It is apparent that the current Icur through the photo-transistor is larger than the dark current Idark of the photo-coupler over the whole range covering the light loading and heavy loading states, and the current in the light loading state has been reduced as compared with the conventional technology shown in FIG. 9.

Second Embodiment

Figure 6:
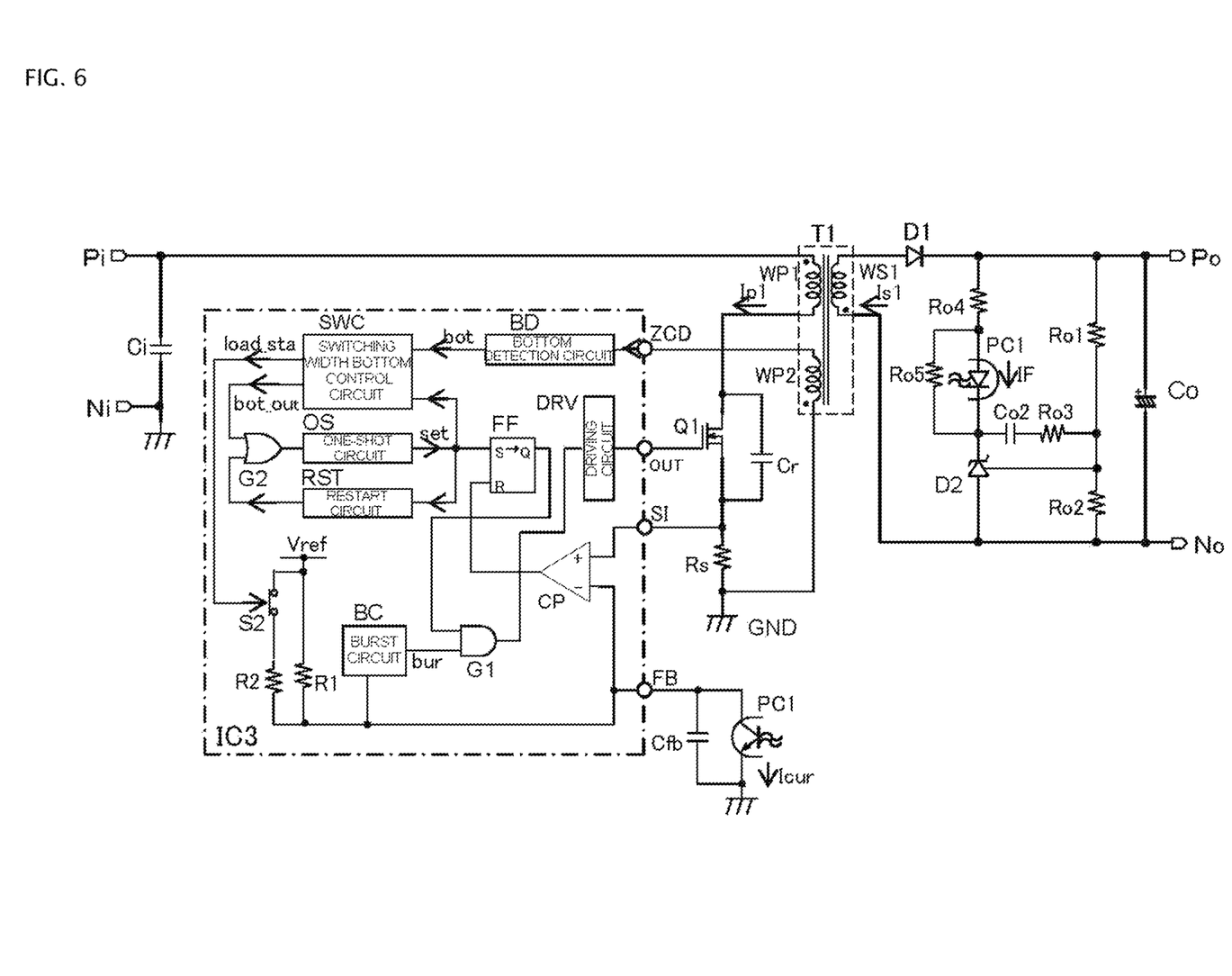
FIG. 6 shows an example of circuit diagram of a switching regulator of a second embodiment of the present invention.

FIG. 6 shows an example of a circuit diagram of a switching regulator of the second embodiment according to the invention. This switching regulator of the second embodiment differs from that of the first embodiment in that a parallel-connected circuit of a resistor R1 and a series-connected circuit of a resistor R2 and a switch S2 is connected between a reference voltage Vref in the control circuit IC 3 and a terminal FB connecting to the collector of the photo-transistor of the photo-coupler PC1. In addition, the signal load_sta to drive the switch S2 is generated and delivered by the switching width bottom control circuit SWC. The same effects as in the first embodiment can be obtained by ON-OFF controlling the switch S2 so that the resistor R1 and the resistor R2 are connected in parallel in a heavy loading state and the resistor R2 is separated leaving solely the resistor R1 in a light leading state. Other construction and operation are the same as in the first embodiment.

Third Embodiment

Figure 7:
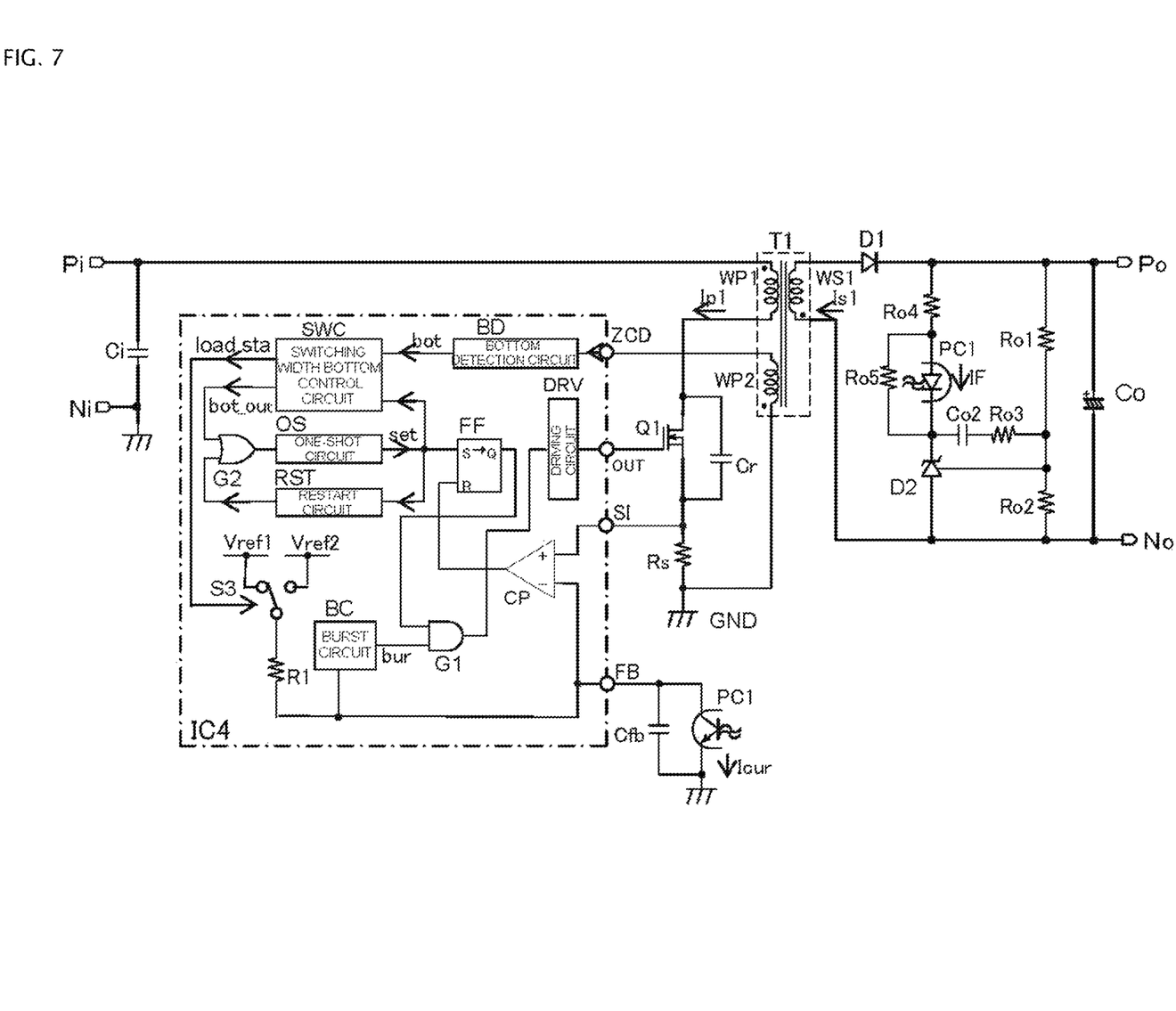
FIG. 7 shows an example of circuit diagram of a switching regulator of a third embodiment of the present invention.

FIG. 7 shows an example of circuit diagram of a switching regulator of the third embodiment according to the invention. This switching regulator of the third embodiment differs from those of the first and second embodiments in that a control circuit IC4 is provided with two reference voltages Vref1, Vref2 and a three-terminal switch to change over the two reference voltages. The control IC4 has a resistor R1 between the common terminal of the three-terminal switch S3 and a terminal FB connecting to the collector of the photo-transistor of the photo-coupler PC1. The signal load_sta to drive the switch S3 is generated and delivered by the switching width bottom control circuit SWC. The same effects as in the first and second embodiments can be obtained by changing over the switch S3 between the Vref1 side in a heavy loading state and the Vref2 side in a light loading state wherein the reference voltages are set to satisfy the relation Vref1>Vref2. Other construction and operation are the same as in the first embodiment.

In the embodiments described thus far, the load status is divided into two cases. However, the load status can be divided into three or more cases using a bottom skip function that controls more than two bottoms. The pull up resistors can also be divided into three or more causes. Similarly, three of more reference voltages can be provided to perform similar control. In the description thus far, the load status is detected using the bottom skip function. The load status can also be detected by using the control voltage (or the FB voltage), which reflects the load status, too.

The present invention relates to reduction of power consumption in a DC to DC conversion circuit with transformer insulation using a photo-coupler for detecting the output voltage. The invention can be applied to AC adapters, charging devices, and controlled power supplies for a variety of devices.

Examples of specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the above description, specific details are set forth in order to provide a thorough understanding of embodiments of the invention. Embodiments of the invention may be practiced without some or all of these specific details. Further, portions of different embodiments and/or drawings can be combined, as would be understood by one of skill in the art.

This application is based on, and claims priority to, Japanese Patent Application No. 2011-270930, filed on Dec. 12, 2011. The disclosure of the priority application, in its entirety, including the drawings, claims, and the specification thereof, is incorporated herein by reference.

What is claimed is:

1. A switching regulator comprising:
a transformer having a primary winding and a secondary winding;
a switching circuit including a switching element that is connected in series to the primary winding, the series-connected circuit of the switching element and the primary winding being connected in parallel to a DC power supply;
a rectifying circuit connected to the secondary winding;
a control circuit to control switching of the switching element to generate DC output voltage from the DC power supply, the DC output voltage being insulated from the DC power supply;
an output voltage detecting circuit including a photo-coupler for insulated detection of the DC output voltage, the photo-coupler having a photo-transistor; and
a load quantity detector configured to detect a state in which power consumption in the load connected to the DC output has reached a predetermined value;
wherein
one end of the photo-transistor is connected to one end of a power supply of the control circuit;
the control circuit comprises a series-connected resistor circuit including a plurality of resistors and a switch for short-circuiting one of the plurality of resistors that are connected between the other terminal of the photo-transistor and a reference voltage point in the control circuit;
the other terminal of the photo-transistor receiving the DC output voltage as a feedback voltage is connected to the control circuit; and
the switch is turned ON or OFF corresponding to an output signal from the load quantity detector.

2. A switching regulator comprising:
a transformer having a primary winding and a secondary winding;
a switching circuit including a switching element that is connected in series to the primary winding, the series-connected circuit of the switching element and the primary winding being connected in parallel to a DC power supply;
a rectifying circuit connected to the secondary winding;

a control circuit to control switching of the switching element to generate DC output voltage from the DC power supply, the DC output voltage being insulated from the DC power supply;

an output voltage detecting circuit including a photo-coupler for insulated detection of the DC output voltage, the photo-coupler having a photo-transistor; and a load quantity detector configured to detect a state in which power consumption in the load connected to the DC output has reached a predetermined value;

wherein one end of the photo-transistor is connected to one end of a power supply of the control circuit;

the control circuit comprises a parallel-connected circuit of a first resistor and a series-connected circuit of a second resistor and a switch, the parallel-connected circuit being connected between the other terminal of the photo-transistor and a reference voltage point in the control circuit;

the other terminal of the photo-transistor receiving the DC output voltage as a feedback voltage is connected to the control circuit; and the switch is turned ON or OFF corresponding to an output signal from the load quantity detector.

3. A switching regulator comprising:

a transformer having a primary winding and a secondary winding;

a switching circuit including a switching element that is connected in series to the primary winding, the series-connected circuit of the switching element and the primary winding being connected in parallel to a DC power supply;

a rectifying circuit connected to the secondary winding;

a control circuit to control switching of the switching element to generate DC output voltage from the DC power supply, the DC output voltage being insulated from the DC power supply;

an output voltage detecting circuit including a photo-coupler for insulated detection of the DC output voltage, the photo-coupler having a photo-transistor; and a load quantity detector configured to detect a state in which power consumption in the load connected to the DC output has reached a predetermined value;

wherein one end of the photo-transistor is connected to one end of a power supply of the control circuit;

the control circuit comprises a resistor one end of which is connected to the other terminal of the photo-transistor, a first reference voltage point and a second reference voltage point in the control circuit, and a switch for changing over between the first and the second reference voltage points, the switch being connected to the other end of the resistor;

the other terminal of the photo-transistor receiving the DC output voltage as a feedback voltage is connected to the control circuit; and the switch is turned ON or OFF corresponding to an output signal from the load quantity detector.

4. The switching regulator according to claim 1, wherein the load quantity detector determines a light loading state by detecting occurrence of two or more times of bottoms in a resonance waveform after turning OFF of the switching element.

5. The switching regulator according to claim 2, wherein the load quantity detector determines a light loading state by detecting occurrence of two or more times of bottoms in a resonance waveform after turning OFF of the switching element.

6. The switching regulator according to claim 3, wherein the load quantity detector determines a light loading state by detecting occurrence of two or more times of bottoms in a resonance waveform after turning OFF of the switching element.

* * * * *